(12) United States Patent
Gao

(10) Patent No.: US 9,060,909 B1
(45) Date of Patent: Jun. 23, 2015

(54) FOLDABLE ELECTRIC WHEELCHAIR

(71) Applicant: Zi Gui Gao, Lewes, DE (US)

(72) Inventor: Zi Gui Gao, Lewes, DE (US)

(73) Assignee: KD HEALTH CARE Co. USA, INC., Lewes, DE (US)

( * ) Notice: Subject to any disclaimer, the term of this patent is extended or adjusted under 35 U.S.C. 154(b) by 0 days.

(21) Appl. No.: 14/451,496

(22) Filed: Aug. 5, 2014

(51) Int. Cl.
```
B62B 7/06       (2006.01)
A61G 5/08       (2006.01)
A61G 5/04       (2013.01)
B60K 1/04       (2006.01)
```

(52) U.S. Cl.
CPC ........ *A61G 5/08* (2013.01); *A61G 5/045* (2013.01); *B60K 1/04* (2013.01); *A61G 2005/0833* (2013.01); *A61G 2005/085* (2013.01); *A61G 2005/0866* (2013.01); *B60K 2001/0461* (2013.01)

(58) Field of Classification Search
CPC ........ B62B 2205/00; B62B 7/06; A61G 5/02; A61G 5/08; A61G 2005/085
USPC ....................................... 280/250.1, 647, 650
See application file for complete search history.

(56) References Cited

U.S. PATENT DOCUMENTS

| | | | | |
|---|---|---|---|---|
| 4,989,890 | A * | 2/1991 | Lockard et al. | 280/42 |
| 6,050,582 | A * | 4/2000 | Horacek | 280/250.1 |
| 6,331,013 | B2 * | 12/2001 | Choi et al. | 280/647 |
| 6,375,209 | B1 * | 4/2002 | Schlangen | 280/250.1 |
| 6,843,500 | B2 * | 1/2005 | Li | 280/642 |
| 6,938,911 | B1 * | 9/2005 | Shyu et al. | 280/250.1 |
| 7,938,434 | B2 * | 5/2011 | Smith | 280/647 |
| 2006/0237943 | A1 * | 10/2006 | Lai | 280/250.1 |

* cited by examiner

*Primary Examiner* — Tony Winner
(74) *Attorney, Agent, or Firm* — Malin Haley DiMaggio & Bowen, P.A.

(57) ABSTRACT

A foldable electric wheelchair that includes an array of support frame members strategically joined together at hinge joint points to allow the support user seat, a back support frame, a main support frame and a lower support frame to be easily manually folded into an array that are substantially parallel in the same plane occupying a small volume. The electric motors are powered by a pair of batteries each of which is mounted inside hollow main frame support members out of the way to reduce the overall volume and weight of the electric wheelchair.

2 Claims, 5 Drawing Sheets

FOLDABLE ELECTRIC WHEELCHAIR

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This invention relates generally to a foldable electric wheelchair, and specifically to a foldable electric wheelchair that is lightweight, easily collapsible, portable, safe and comfortable.

2. Description of Related Art

The use of electric wheelchairs to confer mobility and transport to people with a disability is well known in the prior art. While it is very desirable to have a powered electrical wheelchair, the use of electric motors and batteries adds considerable weight and bulk to the overall weight and size. Conventional electric wheelchairs tend to be heavyweight and large in size which works against portability and its foldablity. Often it is desirable to store the wheelchair when not in use and especially to transport the device in a vehicle so that the wheel chair can travel with the person with the disability and be available wherever that person is located.

The invention described herein overcomes the problems of heavy weight and large volume or bulk for an electric wheelchair by providing a wheelchair that is light weight and foldable and easy to carry while at the same time remains safe and comfortable for the user.

In order to accomplish the improved functionality of the invention, the wheelchair is foldable using a plurality of connecting frame members having hinge joints postioned as connectors for the frame members that can fold sections in a parallel position to decrease the size of the wheelchair. Also the folding design described herein in the invention decreases the overall weight of the wheelchair by a special location of the battery into the frame itself. By strategic positioning of the structural support members of the invention and the hinge joints connecting frame members together, the entire unit can be easily folded and collapsed into a very small size for increased portability and ease of storage.

SUMMARY OF THE INVENTION

A foldable electric wheelchair comprising a foldable support frame, four wheels attached to the support frame, a pair of motors attached near the rear wheels for the driving unit, a support seat for the user connected to the foldable support frame and including a pair of tracks for slidably connecting the user seat to the foldable support frame and a power source such as a pair of batteries that are mounted inside two hollow main support frame members The wheelchair foldable support frame includes two substantially parallel main frame support members that can be rectangular in cross-section and that are hollow, a back support frame that is L-shaped on each side (left and right side) and pivotally connected to one side of both of the two main frame members, a lower support member comprising a pair of parallel rods having one end connected to the lower end of the back support member integrally, a front vertical support member made up of two parallel rods on each side that are pivotably connected to the main frame member and the lower frame members. The hinge points that allow pivoting of the support rods and main frame members are strategically positioned so that when the entire unit is collapsed, the main frame members are in a parallel relationship with the support seat and back support frame resulting in a small volume when folded.

A rigid support seat having a pair of parallel track members one on each side is slideably connected to the back support frame members on each side and the main frame support members at the front of the device. The back support frame members and rods are connected into the parallel tracks in the support seat that allows the back support member to move forward relative to the seat in the collapsing mode so that the seat ends up substantially parallel to the main support frame members and the back support member. The front vertical support frame has parallel rods on each side of the device that are pivotably attached to the lower support frame and the main support frame members also includes an attachment portion to receive the front wheels of the device. The lower support frame member may also include a foot rest that can be attached to receive the feet of the user.

The two main horizontal support frame members are strong rigid but hollow to provide much of the heavy lifting of the device. However each main support frame member provides sufficient storage volume in its hollow inside to receive a battery in each frame member that can be used to power each motor The wheelchair has two arm rests that are attached to the back support frame on each side that pivot out of the way when the entire unit is collapsed.

A pair of protector plates mounted on each side of the wheelchair adjacent the user seat and attached to the main support frame on each side that when positioned above the seat keep the occupant in the seat from falling out of the wheelchair. These protector plates can rotate for a storage position.

By providing a specific array of frame members with strategically located pivotal joints, the invention achieves a very light weight, compact collapsible and foldable electric wheelchair that is safe and supports a large amount of weight but can be collapsed a very small unit and easily stored in a vehicle.

It is an object of this invention to provide a lightweight electronic wheelchair that is easy to fold and carry and safe and comfortable for the user. It is another object of this invention to provide a foldable electronic wheelchair that is relatively small in volume for storage when folded while also when in use it is safe and comfortable for the user. These and other objects of the invention will become clear to one of skill in the art.

DETAILED DESCRIPTION

Figure 1:
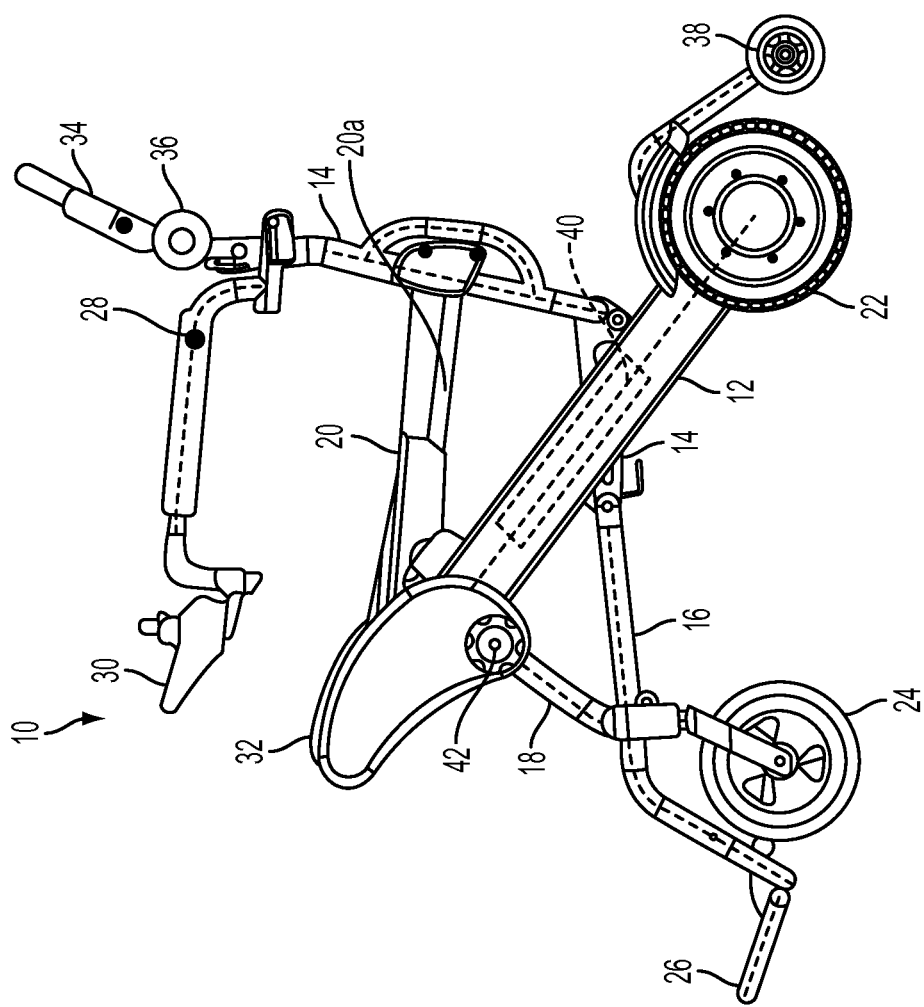
FIG. 1 is a side elevational view of a foldable electric wheelchair representing the invention in an operational mode.

Referring now to FIG. 1 a foldable electric wheelchair 10 representative of the invention is shown. The wheelchair frame has a main support member 12 that is rectangular in cross-section and is hollow inside but is made of a very rigid metal for strength. The main support member 12 is connected at its lower end to a motor and wheel 22. Mounted inside of the main support member 12 is a battery 40 which is discussed below. By storing the battery inside the main support frame member 12, a separate battery platform is eliminated greatly reducing the volume of the wheelchair especially when folded. This also reduces the overall weight of the wheelchair. The upper end of the main frame support member 12 is pivotally connected to the rigid seat 20 having a track 20a and also to a front vertical frame rod 18 pivotally.

The wheelchair supporting frame also includes a back support frame having back support frame member 14 that is L-shaped slidably attached to the rigid seat 20 and the track 20a which allows relative movement between the seat 20 and the back support frame member 14 when the wheelchair is collapsed and folded. The L-shaped back support frame member 14 is connected to a lower frame rod 16 at one end pivotally. The lower support frame rod 16 has a curved end portion that connects to a foot rest 26 that is foldable. The front vertical support rod 18 is connected to the front wheel 24 which is explained below. There is a vertical front support rod 16 on each side of the wheelchair.

An elliptical shape protector panel 32 is pivotally connected to the main frame support member 12 on each side of the wheelchair 10 that acts like a guard for the user when the user is seated in the wheelchair. The guard 32 protects the user from accidentally sliding sideways during use of the device. The protector panels 32 can be firmly held in place or rotated through the use of the rotatable joint 42.

The wheelchair 10 also includes a pair of armrests 28 that can pivot about a pivot joint 36. Attached at one end of armrest 28 is a power control box 30 with a joy stick control member that allows the user to control power to the electric motors for driving the unit.

Attached to the top end of the back support frame member 14 is a manually utilized U-shaped handle bar 34 going across the top back from side to side that can be used to manually direct the wheelchair. The handle bar 34 is pivotally attached to the upper back support frame member 14 with a hinge joint 36. Attached on each side at the bottom of the wheelchair 10 or pair of wheels 38 to prevent the wheelchair from rotating backwards.

Figure 2:
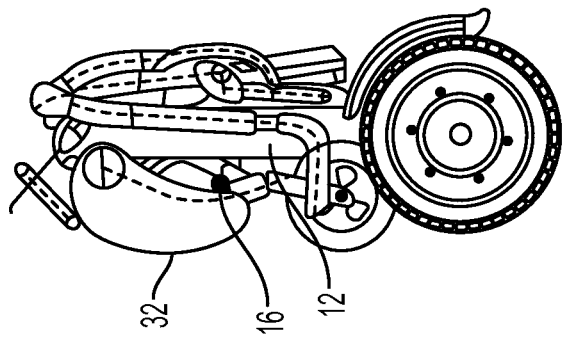
FIG. 2 is a side elevational view of a foldable electric wheelchair representing the invention in a folded collapsed storage mode.

Referring now to FIG. 2 the foldable electric wheelchair is shown in its folded or collapsed position. When folded, the main support frame 12 is substantially parallel to the user seat 20, the back support frame 14 and the lower support frame rod 16. Because of the strategic length and positioning of each of the independent frame member support systems and the rotatable joints, the wheelchair can be collapsed and folded into a very small volume as shown in FIG. 2.

The foldable electric wheelchair 10 is shown in the operating position in FIG. 1. Because of the size and disposition of each of the frame support members including the main frame support member 14 and the location of the pivot joints for the L-shaped back support member 14, the rigid seat 20 having tracks 20a, the lower support frame rod 16 pivotally attached to the back support member 14 and the front support frame rod 18 being pivotally attached to both the mainframe member 12 and frame support rod 16, the wheelchair is capable of being folded into an extremely small volume as illustrated in FIG. 2.

Figure 3:
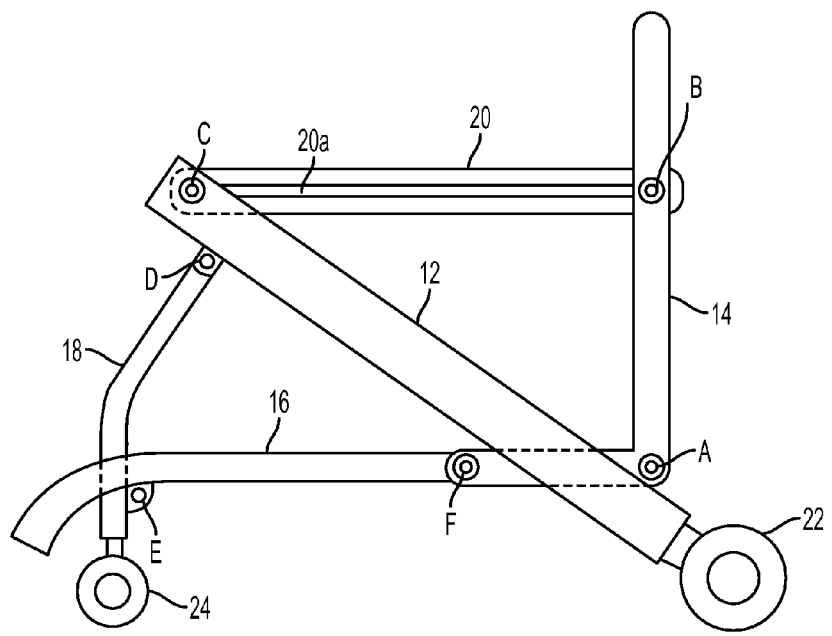
FIG. 3 is a side elevational view of a schematic diagram representing the frame members and their folding points

Referring now to FIG. 3, a schematic diagram is shown of the support frame members and rods that provide the strength and the ability to fold the electric wheelchair into a very small volume and compact unit for storage. The main support frame member 12 is an elongated hollow rectangular tube made of a rigid metal to provide the primary support for the entire wheelchair on each side. The lower end of frame member 12 is connected to the back wheel 22 which is also connected to a motor (not shown in FIG. 3). Inside the frame member 12 is a removable battery 40. The top end of frame member 12 is connected to the rigid seat 20 by hinge joint "C". The bottom top edge of frame member 12 is connected to an L-shaped back support frame member 14 at hinge joint "A". The lower portion of the L-shaped back support member 14 is connected to a lower support rod 16 at hinge joint "F". The rigid seat 20 that the user sits on includes a track 20a that is slidably connected to the back support member 14 at hinge joint "B". A front support rod 18 which has a curved portion is connected to the lower support frame rod 16 at the hinge joint "E" along its lower edge into the main support frame member 12 at its upper end at hinge joint "D". The front vertical support rod 18 also is connected to the front wheel 24. By having strategically sized rigid frame members and strategically positioned hinge joints to permit rotation and sliding action, the wheelchair can be folded into a very small volume in accordance with the invention.

Folding the wheelchair frame assembly for the wheelchair allows the back support frame member 14 which is L-shaped to be pushed toward main support frame member 12 causing the lower end of the back support member to rotate downwardly. Lower support frame rod 16 moves upwardly while the front vertical support frame rod 18 moves inwardly towards the main support frame member 12. When the back support frame member 14 is pushed forward, rigid chair 20 based on track 20a connected at joint "B" moves downwardly pivoting around joint "C" moving into a parallel relationship with the main frame support member 12. The result is a configuration that shows the folding wheelchair above in FIG. 2.

Figures 4, 5:
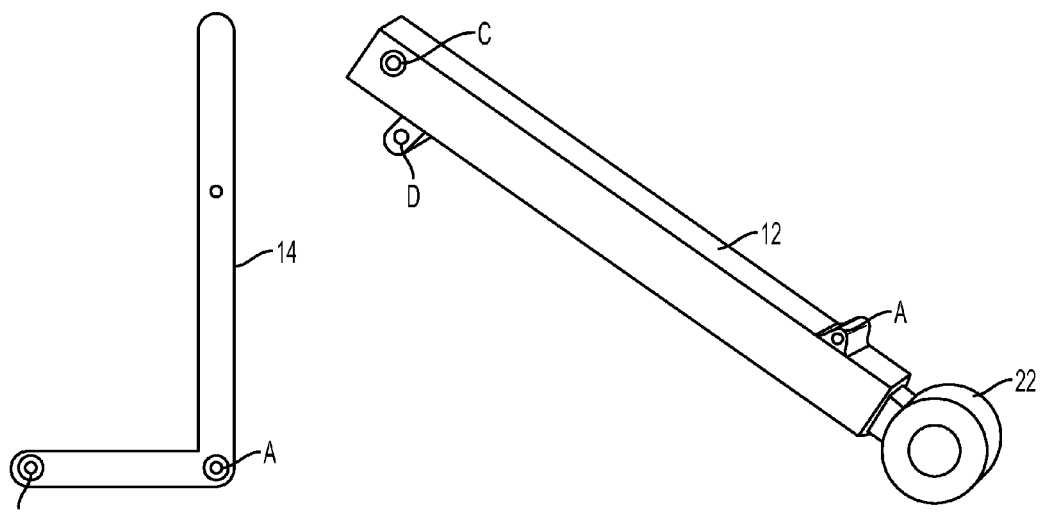
FIG. 4 is a side elevational view of the back support frame member used in the invention.
FIG. 5 is a perspective view of the main support frame that houses the battery as is used in the invention.

FIG. 4 shows the back support frame member 14 that is L-shaped that connects to the seat 20 and the lower frame rod 16. The back support frame member 14 has a parallel part one on each side of the wheelchair that are connected together by rigid tubes forming a rigid unit left and right side members in parallel.

FIG. 5 shows the main support member 12. This is connected at its bottom to a back wheel 22. On each side of the wheelchair there is a main support frame member 12 in parallel. The inside of the frame member 12 is hollow and rectangular in cross-section and includes a battery in each side for running the motor that is connected to the back wheel on its own particular side. Thus there are two batteries 40 each mounted in each frame support member 12 that include wiring (not shown) to connect to the power control unit for driving a respective motor mounted on the left wheel 22 and the opposing wheels. The wheelchair includes two separate motors one in each back wheel that connect to batteries mounted in the main support frame member 12. The mainframe support member 12 also includes a plurality of pivotal joints for the fold up operation including pivotal joints A, C, and D as shown.

Figure 6:
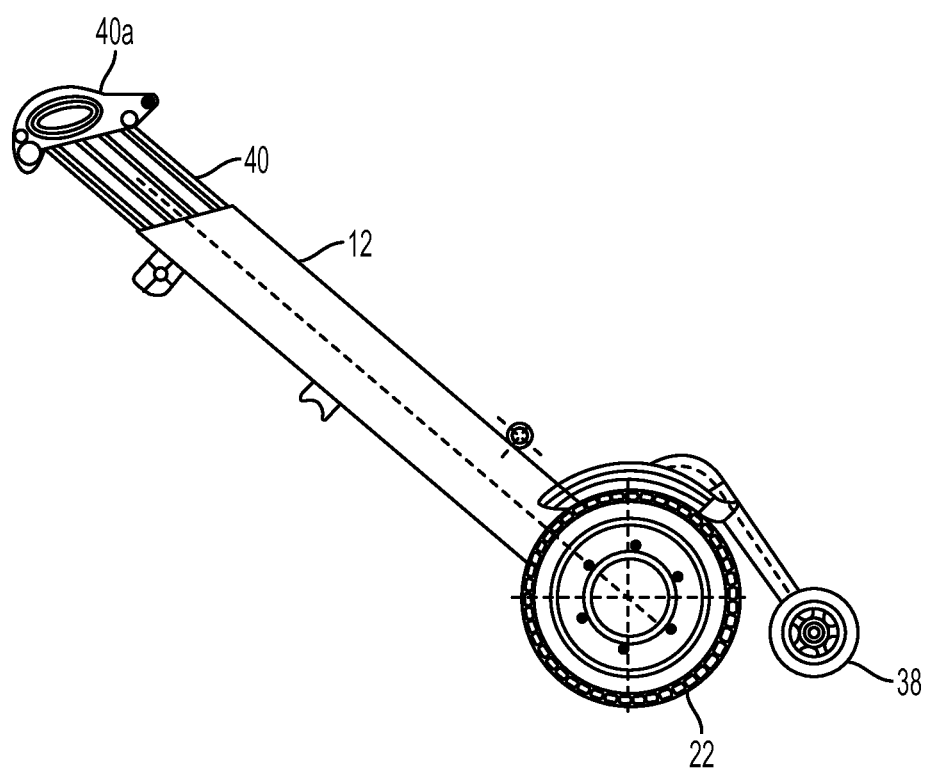
FIG. 6 is a side elevational view of the main support frame member and the battery extended there from FIG. 7 is a cutaway perspective view of the wheels and motors used in the present invention

Referring now to FIG. 6, the main support frame member 12 is shown connected to wheel 22 and a support wheel 38 attached thereto. The rectangular battery 40 is shown partially exposed that fits into the hollow inside of the main support frame member 12. A battery cap end member 40a is connected to one end of battery 40 that acts as an end cap against the main support frame member 12. By placing the battery 40 on each side of the wheelchair within each main support frame member 12, the battery is hidden from view and does not take up extra space especially when the wheelchair is folded. An electrical control unit and wiring and the electric motors are not shown in FIG. 6 that are attached electrically to each battery 40.

Figure 7:
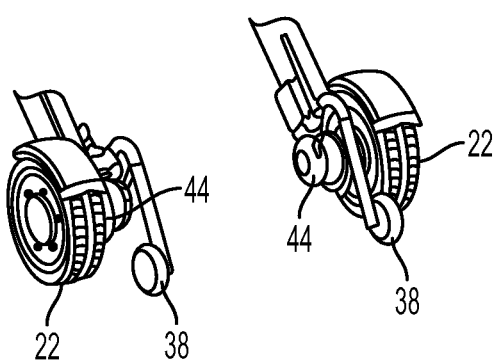

Referring now to FIG. 7, electric motors 44 for the left and right rear wheels 22 are shown that are used to propel the electric wheelchair. The motors 44 are attached by wires not show to a control unit attached to batteries 40 that are stored in the main support frame member 12.

Figure 8:
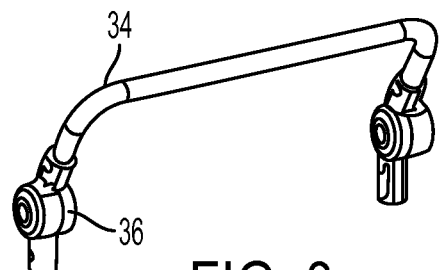
FIG. 8 is a perspective view of a handle used in the present invention.

FIG. 8 shows the top horizontal manually engageable handle bar for manually controlling the wheelchair by hand that can be used by an assistant to the user of the wheelchair. The top bar 34 can be rotated for storage using hinge joint 36 when not in use.

Figure 9:
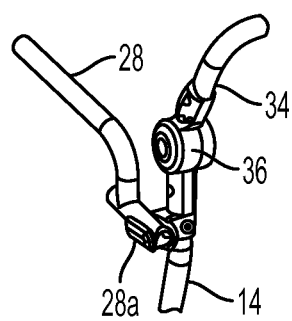
FIG. 9 is a perspective cutaway view of the wheelchair arm rest and a portion of the top guide handle.

FIG. 9 shows a portion of the top handle bar 34 and hinge joint 36 connected to back support frame 14 and an armrest 28 on one side of the wheelchair. The armrest 28 can also rotate to a storage position with a hinge joint 28a for storage. The armrest locks in place perpendicular to the back support frame 14 when in use.

The electric wheelchair disclosed herein can be folded into a very small volume for portability and storage space limitations. This makes the entire wheelchair a very portable unit for the user so that it can be stored in a vehicle or other areas when not in use and for transport of the user. By locating the batteries within two main storage support frame members the batteries are out of the way and do not require a separate battery storage platform which would take up extra volume and weight.

The invention has been described herein but may have additional embodiments that would be obvious to one of ordinary skill in the art.

What is claimed is:

1. A foldable electric wheelchair having a user support seat and a seat frame, a pair of front wheels, a pair of rear drive wheels, a pair of electric motors, one attached to each rear wheel for driving the wheelchair, and a foldable support frame having a plurality of pivotal joints among the frame members, the foldable support frame comprising:
   a pair of main support frame members, said main support frame members each being hollow and made of a rigid material, said support frame member each having a lower end and an upper end, said lower end being attached to a rear wheel and a motor;
   a back support frame that includes a pair of frame members vertically mounted on each side and pivotably attached at its base to said main support frame member on each side, each back support frame member on each side attached to said user seat, said user seat having a pair of parallel side tracks and said back support frame member attached movably to said user seat side tracks to allow relative movement between said back support frame and said user seat;
   said back support frame member being L-shaped including on each side of said wheelchair;
   a lower support frame a having support frame member on each side of said wheelchair, the lower support frame members each having a distal end and a proximal end, said each distal end of said lower support frame members pivotally attached to one end of said back support frame for pivotal movement;
   a front vertical support frame member on each side of said wheelchair, said front vertical support frame member having an upper end and a lower end, said upper end of each vertical support frame member being pivotally attached to said main support frame at the upper end of said main support frame on each side, said lower end of said front vertical support member pivotably attached on each side to said lower support frame members;
   said front vertical support frame members lower end being attached to a pair of front wheels, one on each side for supporting said wheelchair; and
   said main frame support members pivotally attached to said back support members, said lower support members and said front vertical support members all pivotally attached and positionable in an unfolded position for use as a wheelchair and in a folded position wherein the back support frame members are substantially parallel to said mainframe support members in a storage position.

2. The foldable electric wheelchair as in claim 1, further including:
   a battery removably mounted inside each of said main support frame members.

* * * * *